United States Patent Office 2,910,495
Patented Oct. 27, 1959

2,910,495

FLUORESCENT COMPOSITIONS

Paul John George, Brecksville, Ohio

No Drawing. Application September 17, 1956
Serial No. 610,406

11 Claims. (Cl. 260—448.2)

This invention relates to new compositions of matter and more particularly to new and useful organo-silicon polymers. More specifically, the invention is concerned with the production of organo-silicon polymers having C—Si—C links in the main body of the polymer chain.

The prior art discloses numerous methods for the preparation of polymeric organo-silicon polymers having the Si—O—Si—O network. These are more frequently referred to as silicones. However, the art reveals relatively little concerning the preparation of polymers possessing only silicon-carbon links in the polymer chain. One method, disclosed by the prior art, used to prepare such polymers involves the chlorination of an organic group on a silicon atom and the reaction of the resulting compound with an organic halide in the presence of metallic sodium (Rochow, "Chemistry of the Silicones," 2nd edition, page 62, Wiley and Sons, Inc.). The preparation is shown by the following:

$$-\overset{|}{\underset{|}{Si}}-CH_3 + Cl_2 \longrightarrow -\overset{|}{\underset{|}{Si}}-CH_2Cl + HCl$$

$$-\overset{|}{\underset{|}{Si}}-CH_2Cl + Cl-\overset{|}{\underset{|}{Si}}- + 2Na \longrightarrow -\overset{|}{\underset{|}{Si}}-CH_2-\overset{|}{\underset{|}{Si}}- + 2NaCl$$

The modification of this method, shown in "Silicones and Their Uses," by R. R. McGregor (McGraw-Hill), p. 281, involves the formation of a Grignard reagent from an intermediate of the type

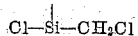

and the subsequent reaction of the resulting Grignard reagent with itself:

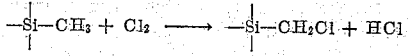

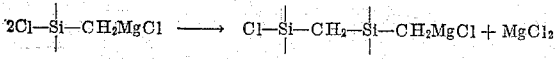

Another exemplary method of the prior art for the preparation of organo-silicon polymers is the reaction of a compound of the type Cl—CH$_2$SiR$_2$OC$_2$H$_5$ with a compound of the type R$_3$Si(CH$_2$SiR$_2$)$_n$Cl in the presence of an alkali metal such as sodium. The compounds thus produced are fluids of the type R$_3$Si(CH$_2$SiR$_2$)$_m$Y having the repeating structure —CH$_2$SiR$_2$—, and are further described in U.S. Patent Number 2,507,512 issued to John T. Goodwin, Jr.

Still another method used for the preparation of polymers with silicon-carbon bonds is revealed in U.S. Patent Number 2,352,974, issued to Eugene G. Rochow, describing preparation of resinous materials of the type

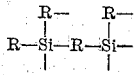

where R represents any divalent organic radical.

In marked contrast to the organo-silicon compounds of the prior art, the compounds of my invention are polymeric solids of a non-resinous nature which have entirely different characteristics and properties than those shown in the prior art. Briefly, my invention comprises the preparation of organo-silicon polymers that have carbon-silicon links in the main body of the polymer chain. These polymers are formed by the use of free radical forming catalysts and involve the reaction between a mono-Grignard derivative of a difunctional aromatic halide with a silicon halide having at least two halogens attached to the silicon, in the presence of a suitable free radical forming catalyst. As stated the properties of my polymers have entirely different properties and are distinctively different from the compounds and resins of the prior art which show carbon-silicon links. These novel properties will be described and be seen from a following detailed description of the invention.

It is an object of the present invention to produce organo-silicon polymers having silicon carbon links by a new and novel method.

It is another object of this invention to prepare organo-silicon polymers which have the property of being fluorescent when exposed to ultraviolet light.

It is another object of this invention to prepare preparations containing the organo-silicon polymers of this invention which are coating compositions which have the property of being fluorescent when exposed to ultraviolet light.

Still another object is to prepare fluorescent pigments for use in coating compositions which are longer lasting and which are very stable and not appreciably affected by sunlight and weather.

Other objects and advantages of the invention will be apparent during the course of the following description.

The novel polymers of my invention involve the reaction of the mono-Grignard derivative of a difunctional aromatic halide with a silicon halide (tin halides may also be used) having at least two halogen atoms attached to the silicon, in the presence of a suitable free radical forming catalyst, to produce organo-silicon polymers of the type

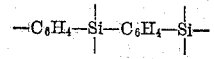

or

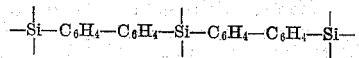

depending on a ratio of the reacting ingredients. The catalyst is selected from the group consisting of the halides of the transitional series of metals in the periodic table.

The mono-Grignard derivatives are of the type, RMgX, where R is a halogen-substituted aromatic hydrocarbon and X is a halogen. Examples of difunctional aromatic halides to be prepared as mono-Grignard derivatives are as follows:

p-Dichlorobenzene
9,10-Dibromoanthracene
p-Dibromobenzene
p-Chlorobromobenzene
p-Iodobromobenzene
p-Iodochlorobenzene
p-Diiodobenzene
1,4-Dibromonaphthalene
1,4-Dichloronaphthalene
1-Bromo-4-chloronaphthalene
1,5-Dibromonaphthalene
1-Bromo-5-chloronaphthalene It is noted that the above aromatic halide compounds are of the type R—X$_n$ where R is an aryl group, X is a halogen, and n is an integer of two or more.

Examples of the silicon halides to be used in the reaction are numerous. Generally, any compound of the type shown can be used:

where A and B can be alkyl, aryl, or halogen, and X is a halogen which may be chlorine, iodine, or fluorine. It is also within the scope of this invention to use tin in place of the silicon.

Silicon tetrachloride
Dimethyl dichloro silane
Diphenyl dichloro silane
Phenyl trichloro silane
Methyl trichloro silane
Vinyl trichloro silane
Dichloro di(p-tolyl) silane
Dichlorodi(p-dimethylaminophenyl) silane
Dioctyl dichlorosilane
Tin tetrachloride
Dimethyl dichloro tin
Diphenyl dichloro tin
Phenyl trichloro tin
Methyl trichloro tin
Dichlorodi(p-tolyl) tin
Dichlorodi(p-dimethylaminophenyl) tin
Dioctyldichloro tin The catalyst is selected from the halides of the transitional series of metals in the periodic table and include, for example, the following:

Cobalt chloride
Manganese chloride
Titanium tetrachloride
Nickel chloride
Zirconium tetrachloride
Cobalt fluoride
Cobalt bromide A typical reaction of the process of my invention to produce the organo-silicon polymers would be the reaction of the mono-Grignard derivative of p-dibromobenzene, $Br—C_6H_4—MgBr$, which can be prepared by conventional means. When this is treated with dimethyldichlorosilane in the presence of anhydrous cobalt chloride, a high molecular weight, insoluble, infusible polymer is formed.

It is to be noted that the novelty of this process stems from the fact that polymeric products are formed by the use of monofunctional Grignard reagents. This is made possible by the metal halide free radical forming catalyst. It has been shown by Kharasch et al. that cobalt halides can bring about coupling of Grignard reagents through the agency of free radicals (JACS, volume 63 (1941), page 2316). In the process described in my invention, these metal halide catalysts are used to produce coupling between an aromatic nucleus and a silicon halide to produce polymeric products.

The role of the catalyst is seen by considering the differences in the products formed when the same materials are reacted in the presence and in the absence of the catalyst. For example, Gruttner and Krause (Berichte, vol. 50 (1917), p. 1559) report the formation of $p-Br—C_6H_4—SiCl_3$, an oil, and $(p-Br—C_6H_4)_2SiCl_2$, soluble prisms, from the reaction of $p-Br—C_6H_4MgBr$ and $SiCl_4$. Using the process of this invention, the same two reactants in the presence of cobalt chloride produce a polymeric high melting, insoluble solid.

As a further indication of the polymeric, high molecular weight nature of this product, the following may be cited. U.S. Patent 2,352,974 above cited describes the products obtained from the reaction of phenylene di-magnesium bromide and silicon tetrachloride as soft or brittle resins, having a melting point of about 100° C., and soluble in such solvents as benzene, toluene and acetone. In marked contrast, the polymers produced in this invention are solids with high decomposition temperatures and no definite melting point. Most of them do not show any sintering or decomposition below 250° C. and many of them are stable above 300° C. As a general rule, they are insoluble in most of the common organic solvents such as ether, acetone, alcohol, chloroform, carbon tetrachloride, glacial acetic acid, pyridine, benzene, toluene, etc. In addition to this, they are stable in concentrated hydrochloric acid, nitric acid, 50% sulfuric acid, and 20% sodium hydroxide.

The following examples of the mode and method of preparing my novel polymers are given as exemplary and are not intended to be limiting in any sense:

*Example 1*

A solution of 24 parts of p-dibromobenzene in 100 ml. ether is allowed to react with 2.4 parts Mg turnings in 50 ml. ether. The resulting Grignard solution is then reacted with 13 parts dimethyldichlorosilane in the presence of 0.1 part anhydrous cobaltous chloride. After reaction the mixture is refluxed 12 hours, the ether is distilled off, and the residue heated with 5% HCl for 15 minutes to remove the cobalt and magnesium salts. The remaining solid is filtered off, washed with acetone, and dried. The product is a yellow solid which does not melt below 300° C., and begins to turn brown when heated over 325° C. It is insoluble in acetone, alcohol, benzene, toluene, pyridine, chloroform, and glacial acetic acid. It displays a brilliant greenish-yellow fluorescence when exposed to ultra-violet light, and retains its fluorescence even after heating with concentrated sulfuric acid at 100° C.

*Example 2*

A Grignard solution from 24 parts p-dibromobenzene, made as in Example 1, is allowed to react with 8.5 parts silicon tetrachloride in the presence of 0.1 part cobaltous chloride. The reaction mixture is treated as described above, giving a yellowish-green solid, insoluble in ordinary organic solvents. It displays a brilliant green-yellow fluorescence under ultra-violet light.

*Example 3*

A Grignard solution from 24 parts p-dibromobenzene, made as in Example 1 is allowed to react with 25 parts diphenyldichlorosilane in the presence of 0.1 part cobaltous chloride. The reaction product, after treatment as described above, is a pale yellow solid. It displays a bright green-yellow fluorescence in ultra-violet light.

*Example 4*

A Grignard solution from 24 parts p-dibromobenzene, made as in Example 1, is allowed to react with 13 parts dimethyldichlorosilane in the presence of 0.1 part nickel chloride. The reaction product is treated as described above, giving a light yellow solid, insoluble in common organic solvents. It displays a bright green-yellow fluorescence under ultra-violet light.

As shown in the examples above, the organo-silicon polymers described by my invention have a useful characteristic in their brilliant fluorescence. Heretofore, fluorescent materials for use in coating compositions have been mainly derivatives of various fluorescent dyes such as rhodamines, fluoresceins, and the inorganic types exemplified by the various metallic sulfides such as zinc sulfide and the other phosphors composed of activated silicates, tungstates, etc. The prior fluorescent materials such as the fluorescent dyes and inorganic salts, when used in coating compositions have the disadvantage of being relatively unstable, especially when used outdoors. After a period of time, these materials undergo deterioration and decomposition when subjected to the weather elements, especially sunlight. The fluorescent polymers of my invention are very stable and are not appreciably affected by sunlight and weather, thus they have a long and useful life in coating compositions. An additional advantage in the use of these organo-silicon polymers as fluorescent pigments in coating compositions is the fact that being organic they are compatible with organic solvents, oils, resins, driers, and other ingredients of coating compositions such as paints, lacquers, etc. Examples of the use of my fluorescent organic polymers as pigments in coating compositions are as follows:

Example 5

The polymeric organo-silicon reaction product obtained as described in Example 1 was mixed with a conventional drying oil base paint. The latter had the composition:

65.3% pigment (titanium-calcium carbonate)
34.7% vehicle (linseed oil, mineral spirits, drier)

The final mixture contained 2% fluorescent organo-silicon polymer. When applied to a surface the coating dries to a film which fluoresces brilliant green-yellow when exposed to ultra-violet light.

Example 6

A mixture comprising 2% of the organo-silicon polymer obtained as described in Example 1 and 98% of a cellulose acetate-in-butyl acetate lacquer was applied to a surface. When dry, the coating fluoresces brilliant green-yellow when exposed to ultra-violet light.

The reactions occurring to form the organo-silicon polymers of my invention are complex and they may be illustrated by the following, where the mono-Grignard reagent formed from p-dibromobenzene, and dimethyldichlorosilane and used as typical reactants in cobalt chloride as a catalyst:

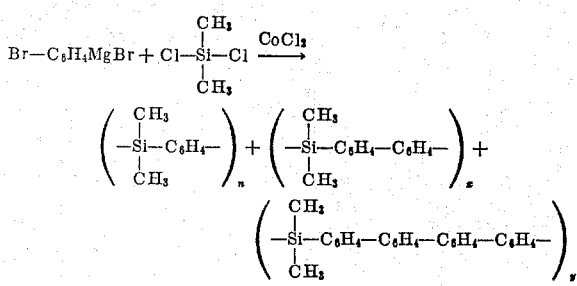

These formulas are not intended to be limiting and merely indicate probable structures for the polymers. It should be pointed out that the metal halide catalyst, in this example, cobaltous chloride, functions as a free radical former, producing free radicals which subsequently couple to form products such as those indicated. It is also apparent that more complex products would be formed if silicon tetrachloride or trichlorosilane were to be used in place of dimethyldichlorosilane.

In the preparation of the organosilicon polymers of this invention containing the silicon to carbon links, a suitable method, for example, comprises effecting the reaction between one mole of the silicon halide and at least one but not more than two molar equivalents of the mono-Grignard derivative of the aryl halide.

It is further within the scope of this invention that the alkyl and aryl radicals of the reactants may be substituted alkyl and aryl radicals which do not alter the properties of the final product. By the use of substituted compounds it is possible to vary the color of the fluorescence produced.

The uses that these novel organo-silicon polymers have are varied. As fluorescent pigments, they are suitable in all types of applications where material which fluoresces on exposure to ultra-violet light is desired. Being inert as they are, they can be readily dispersed in ordinary paint formulations, lacquers, or any other compositions of this type (i.e. protective coatings). They can also be used as phosphors in fluorescent light types of lighting fixtures (as coatings for fluorescent lamps). They can be combined with each other to produce combinations of colors. Further, being efficient absorbers of ultraviolet light, they can be used as stabilizers in various polymer compositions such as vinyl polymers, which suffer degradation on excessive exposure to light.

This application is a continuation-in-part of my application Serial No. 273,340, filed February 25, 1952, now abandoned.

I claim:

1. A fluorescent, non-resinous, polymeric, high molecular weight, organic reaction product comprising silicon-carbon linkages in the polymeric chain prepared by reacting a mono-Grignard reagent having the general formula R—Mg X where R is a halogen substituted aryl group and X is a halogen, and a compound having the general formula

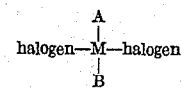

where M is a metal selected from the group consisting of tin and silicon, and A and B are selected from the group consisting of alkyl, aryl, and halogen, in the presence of a catalyst selected from the group consisting of the halides of cobalt, manganese, titanium, nickel, and zirconium.

2. The reaction product of claim 1 wherein M is silicon.

3. The reaction product of claim 1 wherein M is tin.

4. The reaction product of claim 1 wherein one of the reactants is silicon tetrachloride.

5. The reaction product of claim 1 wherein one of the reactants is phenyltrichlorosilane.

6. The reaction product of claim 1 wherein one of the reactants is dimethyldichlorosilane.

7. The reaction product of claim 1 wherein one of the reactants is diphenyldichlorosilane.

8. The reaction product of claim 1 wherein one of the reactants is the mono-Grignard derivative of p-dibromobenzene.

9. A fluorescent pigment which comprises the reaction product of claim 11.

10. The method of preparing a fluorescent, non-resinous polymeric, high molecular weight, organic reaction product comprising silicon-carbon linkages in the polymeric chain, which comprises reacting a mono-Grignard reagent having the general formula R—Mg X where R is a halogen substituted aryl group and X is a halogen, with a compound having the general formula

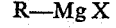
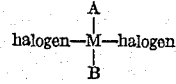

where M is a metal selected from the group consisting of tin and silicon and A and B are selected from the group consisting of alkyl, aryl, and halogen, in the presence of a catalyst selected from the group consisting of the halides of cobalt, manganese, titanium, nickel, and zirconium.

11. A process of preparing a fluorescent organic compound which comprises reacting p-dibromobenzene with magnesium, reacting the resulting mono-Grignard reagent with dimethyldichlorosilane in the presence of catalytic amounts of anhydrous cobaltous chloride and recovering a solid polymeric product.

(References on following page)

References Cited in the file of this patent

UNITED STATES PATENTS 2,352,974 Rochow _____ July 4, 1944

OTHER REFERENCES

Gruttner et al.: "Berichte der Deutschen Chem. Gesellschaft," vol. 50 (1917), p. 1559–68.

Kharasch: "Jr. Am. Chem. Soc.," vol. 63 (1941), pp. 2316–20.

Kharasch: Ibid., vol. 65 (1943), p. 493.

Miall et al.: "A New Dictionary of Chemistry," Longmans, Green and Co., New York, publishers, 2nd ed. 1949, p. 522.

UNITED STATES PATENT OFFICE
CERTIFICATION OF CORRECTION

Patent No. 2,910,495                         October 27, 1959

Paul John George

It is hereby certified that error appears in the above numbered patent requiring correction and that the said Letters Patent should read as corrected below.

Column 6, line 13, after "comprising" insert -- linkages of the group consisting of tin-carbon and --; line 14, strike out "linkages"; line 46, for the claim reference numeral "11" read -- 1 --; same column 6, line 49, after "comprising" insert -- linkages of the group consisting of tin-carbon and --; same line, after "silicon-carbon" strike out "linkages".

Signed and sealed this 4th day of July 1961.

(SEAL)
Attest:

ERNEST W. SWIDER                            DAVID L. LADD
Attesting Officer                              Commissioner of Patents